United States Patent
Takahashi et al.

(10) Patent No.: US 7,891,916 B2
(45) Date of Patent: Feb. 22, 2011

(54) INSERT FOR DRILL AND INDEXABLE INSERT DRILL

(75) Inventors: Hidebumi Takahashi, Toride (JP); Touru Narita, Toride (JP)

(73) Assignee: Mitsubishi Materials Corporation, Tokyo (JP)

( * ) Notice: Subject to any disclaimer, the term of this patent is extended or adjusted under 35 U.S.C. 154(b) by 138 days.

(21) Appl. No.: 12/413,725

(22) Filed: Mar. 30, 2009

(65) Prior Publication Data

US 2009/0245949 A1 Oct. 1, 2009

(51) Int. Cl.
*B23B 27/16* (2006.01)
*B23B 51/00* (2006.01)

(52) U.S. Cl. .......................... 407/30; 407/114

(58) Field of Classification Search ............... 407/407, 407/30, 33, 34, 42, 51, 53, 66, 67, 103, 113–116; 408/231, 233
See application file for complete search history.

(56) References Cited

U.S. PATENT DOCUMENTS

| 3,963,365 | A | | 6/1976 | Shllenberger, Jr. | |
|---|---|---|---|---|---|
| 4,940,369 | A | * | 7/1990 | Aebi et al. | 407/42 |
| 4,995,767 | A | * | 2/1991 | Segal | 407/41 |
| 5,145,295 | A | * | 9/1992 | Satran | 407/113 |
| 5,486,073 | A | * | 1/1996 | Satran et al. | 407/113 |
| 5,957,633 | A | * | 9/1999 | Hall | 408/187 |
| 6,048,140 | A | * | 4/2000 | Johnson | 407/42 |
| 7,604,441 | B2 | * | 10/2009 | Bhagath | 407/113 |
| 2003/0223832 | A1 | | 12/2003 | Roman et al. | |

FOREIGN PATENT DOCUMENTS

| JP | 53-15234 | 5/1978 |
|---|---|---|
| JP | 2005-527390 A | 9/2005 |

* cited by examiner

*Primary Examiner*—Will Fridie, Jr.
(74) *Attorney, Agent, or Firm*—Leason Ellis LLP.

(57) ABSTRACT

An insert for a drill in which one of the cutting edges respectively formed at four side ridge portions of a rake face of a square flat plate-shaped insert body is made to protrude toward the tip of the drill body of the indexable insert drill while being detachably attached is provided. Each of the cutting edges has a corner cutting edge located at a corner of the rake face, and a major cutting edge and a wiper edge which extend substantially toward one peripheral direction of the rake face from a corner cutting edge. The major cutting edge has a first major cutting edge portion which has a convexly curved shape and extends from the corner cutting edge, and a second major cutting edge portion which smoothly touches the first major cutting edge portion and extends linearly, as seen from a direction facing the rake face. The wiper edge has a straight shape intersecting the second major cutting edge portion at an obtuse angle.

9 Claims, 5 Drawing Sheets

INSERT FOR DRILL AND INDEXABLE INSERT DRILL

BACKGROUND OF THE INVENTION

1. Field of the Invention

The present invention relates to an insert for an indexable insert drill attached to an insert detachable drill, and an indexable insert drill to which the insert for an indexable insert drill is attached. Priority is claimed on Japanese Patent Application No. 2008-089679, filed Mar. 31, 2008, the content of which is incorporated herein by reference.

2. Description of Related Art

As an insert for a drill and an indexable insert drill, a drill in which substantially square flat plate-shaped inserts for a drill are detachably attached to the tip of a drill body on the radial inner peripheral side and outer peripheral side which are opposite to each other across the axis of the drill body is disclosed in, for example, Japanese Patent Examined Patent Application, Second Publication No. Sho 53-15234 and Published Japanese Translation No. 2005-527390 of PCT International Publication. In such an indexable insert drill, one of the cutting edges formed at respective sides of a square rake face of the insert for a drill is made to protrude toward the tip of the drill body. The single cutting edges of the inner and outer peripheral inserts for a drill are made to intersect each other in a rotational locus around the axis, the inner peripheral side of a machining hole is drilled by the radial inner peripheral cutting edge, and the outer peripheral side of the machining hole is drilled by the single cutting edge of the outer peripheral insert, respectively, whereby the machining hole with a predetermined diameter is formed in a work material.

However, in an indexable insert drill described in Japanese Patent Examined Patent Application, Second Publication No. Sho 53-15234 among the above publications, both the inner and outer peripheral inserts for a drill are attached such that a corner cutting edge located at a corner of a square rake face is made to protrude toward the distal end of a drill body in the direction of the axis of the drill body, and the single cutting edge of each insert for a drill contacts a work material from the corner cutting edge. Therefore, loss of the cutting edge may easily occur. Additionally, in the radial outer peripheral insert of these inserts, a corner cutting edge between the single cutting edge and the other single cutting edge adjacent to the outer peripheral side of this single cutting edge is located at an outermost periphery of the drill body. Therefore, when the amount of feed is increased, there is also a possibility that the surface quality of the inner wall surface of a machining hole may deteriorate.

Meanwhile, in the insert for a drill described in Published Japanese Translation No. 2005-527390 of PCT International Publication, a transition cutting edge is provided in the above single cutting edge and formed in the shape of a step. In this case, when such a cutting edge is directed toward the outer peripheral side of the drill body in the radial outer peripheral insert for a drill, there is a possibility that the step may interfere with the inner wall surface of a machining hole, and degradation of surface quality may also occur. Additionally, in the indexable insert drill described in Published Japanese Translation No. 2005-527390 f PCT International Publication, a cutting edge portion located at an extreme end in the direction of the axis of the drill body in the above single cutting edge is formed in the shape of a straight line extending in a direction substantially vertical to the axis of the drill body. Therefore, contact of the cutting edge portion to a work material is performed simultaneously. Thus, a large impact occurs, and balance is easily upset. Moreover, inserts for a drill differ on the inner peripheral side and outer peripheral side. Therefore, there is also a possibility that management may become complicated, and erroneous attachment of the inserts may occur at the inner and outer peripheries.

The invention was made in light of the above, and has an object to provide an insert for a drill capable of providing a high surface quality of the inner wall surface of a machining hole, extending the lifespan of an insert, and improving machining accuracy (cutting accuracy) without causing a loss or radial run out of cutting edges at the time of contact with a work material, and to provide an indexable insert drill capable of performing such drilling using the same insert on the inner and outer peripheral sides.

SUMMARY OF THE INVENTION

In order to solve the above problems and achieve the above object, the insert for a drill of a first aspect of the invention is an insert for a drill having a square flat plate-shaped insert body, the insert body having one square face being a rake face, each of four side ridge portions of the rake face being formed with a cutting edge, the insert for a drill being detachably attached to an indexable insert drill with one of the cutting edges being made to protrude toward the tip of the drill body of an indexable insert drill, each of the cutting edges having a corner cutting edge located at a corner of the rake face, and a major cutting edge and a wiper edge which extend substantially toward one peripheral direction of the rake face from the corner cutting edge, the major cutting edge having a first major cutting edge portion which has a convexly curved shape and extends from the corner cutting edge, and a second major cutting edge portion which is smoothly connected to the first major cutting edge portion and extends linearly, as seen from a direction facing the rake face, and the wiper edge having a straight shape intersecting the second major cutting edge portion at an obtuse angle.

Additionally, the indexable insert drill of a second aspect of the invention is an indexable insert drill including a drill body which is rotated around an axis, and at least two inserts for a drill according to the first aspect to the present invention, each insert body having the same shape and size, the inserts for a drill being detachably attached to a tip of the drill body on the inner peripheral side and outer peripheral side with respect to the axis of the drill body, and one of the cutting edges thereof being made to protrude from the tip of the drill body, wherein the inserts for a drill attached to the radial inner peripheral side and outer peripheral side are adapted such that both the first major cutting edge portions of the single cutting edges are located on the radial outer peripheral side, and the rotational loci of the single cutting edges around the axis of the drill body are made to intersect each other, and wherein the radial outer peripheral insert (hereinafter referred to as "outer peripheral insert") is disposed such that the wiper edge of the other single cutting edge adjacent to the radial outer peripheral side of the single cutting edge extends to a direction of the axis in the rotational locus, and wherein the radial inner peripheral insert (hereinafter referred to as "inner peripheral insert") is adapted such an imaginary plane passing through an intersection point between the rotational loci of the single cutting edges of the radial inner and outer peripheral inserts, and orthogonal to the axis is made to intersect the second major cutting edge portion of the single cutting edge thereof, and the first major cutting edge portion of the single cutting edge in the inner peripheral insert is made to protrude toward a distal end in a direction of the axis of the drill body.

Accordingly, in the indexable insert drill of the above configuration, the same inserts having an insert body of the same shape and size are attached to the radial inner and outer peripheries of the drill body. Therefore, erroneous attachment does not occur in the inner and outer peripheral inserts, and it is only necessary to prepare one type of insert. Thus, insert management can also be simplified.

Also, in the inner peripheral insert, the second major cutting edge portion on the major cutting edge among the cutting edges made to protrude toward the tip of the drill body intersects the imaginary plane passing through the intersection point between the single cutting edges of the inner and outer peripheral inserts, and thereby, the first major cutting edge portion of the major cutting edge which is formed in the shape of a convex curve is located at the distal end so as to contact a work material. Thus, a loss does not occur unlike the case where a corner cutting edge contacts a work material, and radial run out does not occur unlike the case where a straight cutting edge portion contacts a work material.

Meanwhile, in the outer peripheral insert, the wiper edge of the other single cutting edge adjacent to the radial outer peripheral side of a single cutting edge directed to the tip is formed in the shape of a straight line, and disposed so as to extend to a direction of the axis of the drill body. Thus, the inner wall surface of a machining hole can be finished by the wiper edge, and thereby, high surface quality can be secured in the inner wall surface. Moreover, since the wiper edge and the second major cutting edge portion of the major cutting edge is disposed in a direction in which they intersect each other at an obtuse angle, the intersection portion does not interfere with the inner wall surface of a machining hole.

Here, in the insert for a drill, preferably, the radius of curvature of a convex curve formed by the first major cutting edge portion in plan view is set to the range of 0.6×D to 1.0×D with respect to the drill diameter D of the indexable insert drill. If the radius of curvature is smaller than this range, there is a possibility that a loss may occur at the time of contact, whereas if the radius of curvature is greater than this range, a large amount of radial run out may occur at the time of contact.

Additionally, the length of the convex curve chord formed by the first major cutting edge portion is set to the range of 0.3×IC to 0.7×IC with respect to the diameter IC of a circle inscribed in this rake face, in plan view. If the length of the chord is smaller than this range, the circular-arc first cutting edge portion becomes small in the major cutting edge. Therefore, there is a possibility that a loss may occur at the time of contact to a work material. On the other hand, if the length of the chord is greater than this range, the distance of protrusion from the imaginary plane of the first major cutting edge portion toward the tip becomes large in the inner peripheral insert. Therefore, the distance by which only the inner peripheral indexable insert drills a work material at the time of contact also becomes large. Thus, balance is upset, and radial run out also occurs easily.

Moreover, preferably, the length of the wiper edge is set to 0.1 mm to 0.5 mm in plan view. If the length of the wiper edge is smaller than this range, there is a possibility that it may become difficult to smoothly finish the inner wall surface of a machining hole when the amount of feed becomes large. On the other hand, if the length of the wiper edge is greater than this range there is a possibility that the length of contact with the inner wall surface may become too large, causing an increase in cutting resistance.

Preferably, the wiper edge intersects the second major cutting edge portion at an angle of 1° to 3° in plan view. If this angle is too small, the second major cutting edge portion nearly extends linearly to the wiper edge. As a result, there is a possibility that this second major cutting edge portion may contact the inner wall surface of a machining hole, thereby causing an increase in cutting resistance. On the other hand, if the angle is too large, there is a possibility that the inner wall surface may be damaged and the surface quality thereof may deteriorate when the wiper edge and the second major cutting edge portion interfere with the inner wall surface of a machining hole.

Meanwhile, in the indexable insert drill of the second aspect of the invention, preferably, the distance in the direction of the axis of the drill body between a protruding end of the first major cutting edge portion of the single cutting edge in the direction of the axis of the drill body in the inner peripheral insert, and an extreme end of the wiper edge of the single cutting edge in the direction of the axis of the drill body in the outer peripheral insert is set to 0.05 mm to 0.3 mm. If the distance is smaller than the above range, and if the amount of feed of the drill body is large, the wiper edge of the single cutting edge directed toward the tip of the outer peripheral insert is greatly involved in cutting, whereby wear or the like occurs, there is a possibility that the wiper edge cannot be used for finishing of the inner wall surface of a machining hole. On the other hand, if the distance is greater than this range, the distance of protrusion of the first major cutting edge portion in the inner peripheral insert becomes large. As a result, there is a possibility that the distance by which only the inner peripheral indexable insert drills a work material at the time of contact also becomes long, and thus, radial run out also occurs easily.

Preferably, the second major cutting edge portion of the single cutting edge in the radial inner peripheral insert is made to intersect the imaginary plane at an intersection angle of 3° to 8°. If the intersection angle is too small, the straight second major cutting edge portion contacts a work material largely along with the first major cutting edge portion at the time of contact, whereby radial run out may easily occur. On the other hand, if the intersection angle is too large, there is a possibility that the portion of the first major cutting edge portion of the major cutting edge on the side of the corner cutting edge in the single cutting edge of the inner peripheral insert, or the corner cutting edge itself is greatly involved in cutting at the time of contact or at the time of drilling, whereby a loss may easily occur.

Moreover, preferably, the second major cutting edge portion of the single cutting edge in the radial outer peripheral insert is made to intersect the imaginary plane at an intersection angle of 1° to 3°. If the intersection angle is too small, radial run out easily occur when the second major cutting edge portion in the single cutting edge of the outer peripheral insert approaches a state of being located on the imaginary plane vertical to the axis and the outer peripheral insert contacts a work material. On the other hand, if the intersection angle is too large, the outer peripheral wiper edge connected to the second major cutting edge portion via the first major cutting edge portion and the corner cutting edge may be located on the rear end in the direction of the axis of the drill body. As a result, when a machining hole is a blind hole, there is a possibility that an inner wall surface cannot be finished to near the bottom of the hole.

As described above, according to the insert for a drill of the first aspect of the invention and the indexable insert drill of the second aspect to which this insert is attached, a loss does not occur in the cutting edges at the time of contact with a work material, the lifespan of an insert can be extended, and smooth drilling can be performed. Additionally, radial run out can be prevented from occurring in the drill body at the time of contact, and the inner wall surface of a machining hole can be finished with high surface quality. Thus, it is possible to form a machining hole which has excellent roundness, concentricity, and cylindricity, and has a high degree of precision. Additionally, since an insert for a drill with an insert body of the same dimension and shape is attached to inner and outer peripheries of the tip of the drill body, insert management can be simplified and efficient.

DETAILED DESCRIPTION OF THE INVENTION

Figure 1:
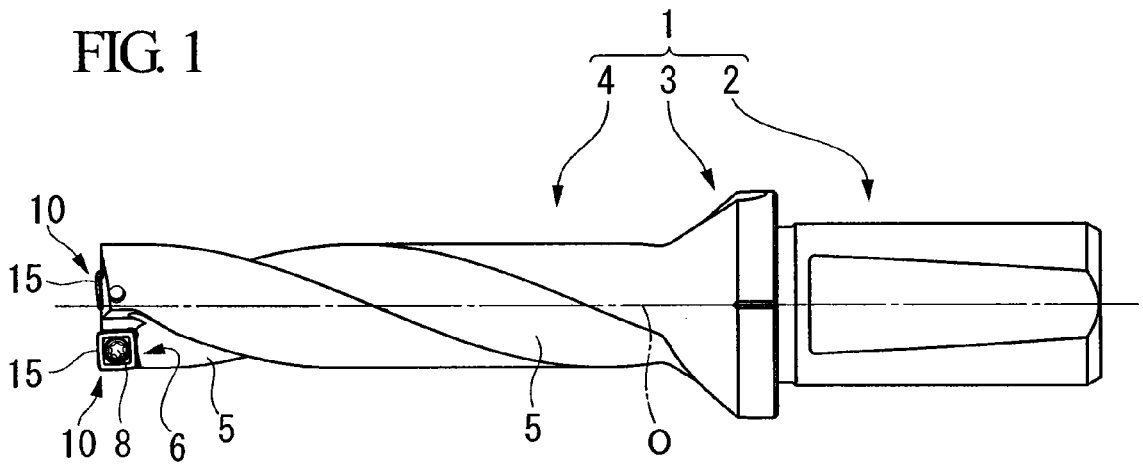
FIG. 1 is a plan view showing one embodiment of an indexable insert drill of the invention.
Figure 2:
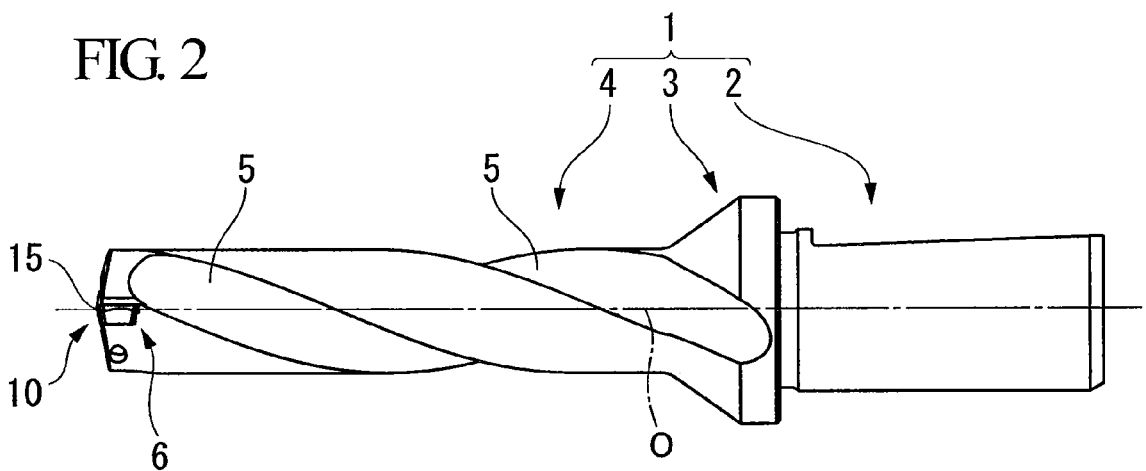
FIG. 2 is a side view of the indexable insert drill of the embodiment shown in FIG. 1.
Figure 3:
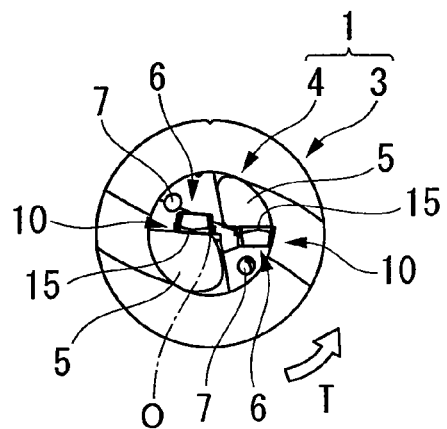
FIG. 3 is a front view when the indexable insert drill of the embodiment shown in FIG. 1 is seen from the tip in the direction of the axis O.

FIGS. 1 to 9 show one embodiment of the invention. Among these drawings, FIGS. 1 to 5 show an indexable insert drill of this embodiment, and FIGS. 6A, 6B, 7 and 8 show an insert of this embodiment. In the indexable insert drill of this embodiment, a drill body 1 is formed from steel or the like and is formed in a substantially cylindrical shape having an axis O as its center. A rear end portion (a right portion in FIGS. 1 and 2) of the drill body is used as a shank portion 2, and a tip portion (a left portion in FIGS. 1 and 2) of the drill body is used as a cutting portion 4 via a flange 3. The shank portion 2 is gripped by a spindle of a machine tool, is rotated in a drill rotational direction T around the axis O (a counterclockwise direction as shown in FIG. 3 as seen from the tip in the direction of the axis O in this embodiment), and is used for drilling a work material.

In the cutting portion 4, a pair of chip discharge grooves 5, which is twisted backward in the drill rotational direction T around the axis O as it approaches the rear end, is formed on opposite sides of the axis O from the tip of the cutting portion to the flange 3, and insert mounting seats 6 are each formed at respective tips of wall faces of the chip discharge grooves 5 which face the drill rotational direction. T. In addition, feed holes 7 for cutting oil, which extend from the shank portion 2, are bored between the pair of chip discharge grooves 5 in a peripheral direction, and are opened to the tip face of the drill body 1.

Figure 4:
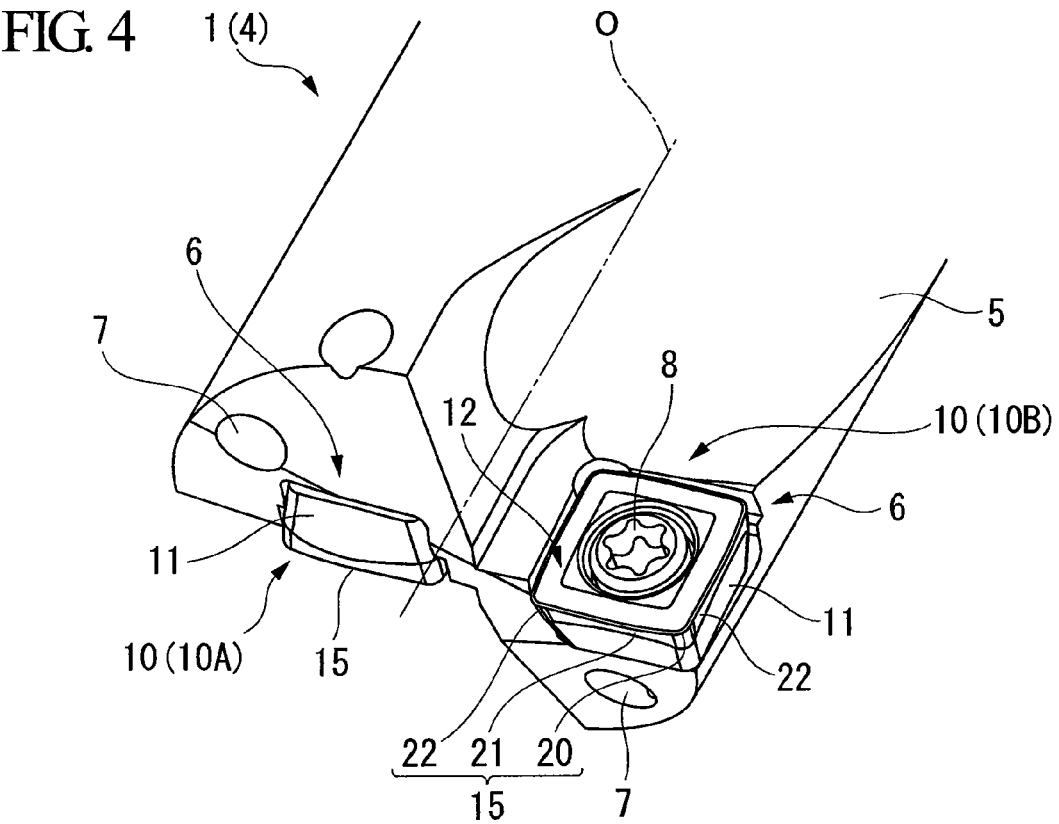
FIG. 4 is a perspective view showing the periphery of an outer peripheral insert of the indexable insert drill of the embodiment shown in FIG. 1.
Figure 5:
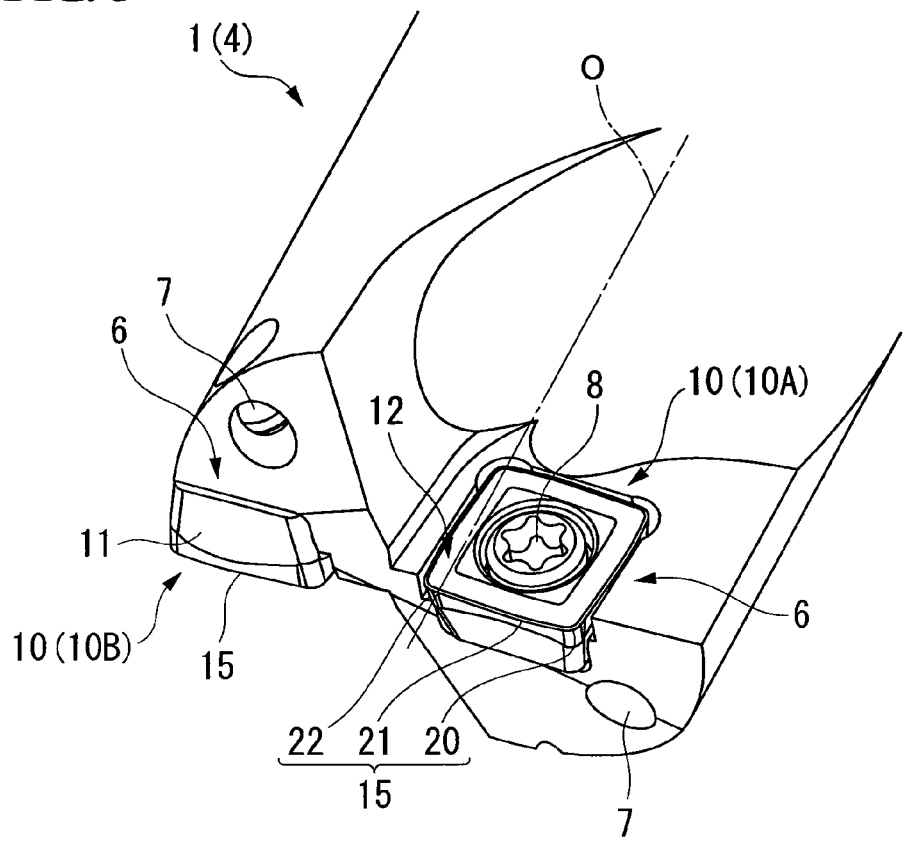
FIG. 5 is a perspective view showing the periphery of an inner peripheral insert of the indexable insert drill of the embodiment shown in FIG. 1.

Here, the insert mounting seats 6, as shown in FIGS. 3 to 5, are formed such that one insert mounting seat 6 is located on the outer peripheral side of the drill body 1 and is opened to an outer peripheral face of the cutting portion 4, and the other insert mounting seat 6 is located on the inner peripheral side of the drill body 1 and sticks out toward the opposite side beyond the axis O. Also, an insert 10 for a drill of this embodiment is detachably attached to each of the insert mounting seats 6 by with a clamp screw 8.

As for insert 10 for a drill, an insert body 11 of the insert is formed from a hard material, such as cemented carbide, and has a substantially square flat plate shape as shown in FIGS. 6A, 6B, 7, and 8. One of a pair of square faces of the insert is used as a rake face 12, the other square face is used as a seating face 13 seated on a bottom face of the insert mounting seat 6, four side faces around the insert are used as flank faces 14, and cutting edges 15 are formed at intersection ridgeline portions of the rake face 12 and the flank faces 14, i.e., at four side ridge portions of the rake face 12.

In addition, a mounting hole 16 which passes through the insert body 11 in its thickness direction (vertical direction in FIG. 7) and allows the clamp screw 8 to be inserted therethrough is formed from the middle of the rake face 12 to the seating face, and the insert bodies 11 are formed so as to be rotationally symmetrical to each other by every 90° around a centerline L of the mounting hole 16 passing through the center of the rake face 12. Additionally, a flat boss face 17 whose outer edge has a square shape is formed around an opening of the mounting hole 16 on the side of the rake face 12, and the cutting edges 15 are formed with a land 18. The boss face 17 protrudes in the thickness direction. Between the boss face 17 and the land 18 of the cutting edges 15, a breaker groove 19 whose cross-section is concave is formed so as to have a substantially fixed width at the entire periphery of the rake face 12.

Each cutting edge 15 is comprised of a ¼ convex circular-arc-shaped edge 20 which is located at a corner of a square formed by the rake face 12, a major cutting edge 21 which extends substantially in one peripheral direction (a clockwise direction with the centerline L as a center, as seen from a direction facing the rake face 12 in the direction of the centerline L as shown in FIG. 6 in this embodiment) of the rake face 12 from the corner cutting edge 20, and an wiper edge 22. The wiper edge 22 is continuous with the corner cutting edge 20 of the next cutting edge 15 adjacent to the above cutting edge in the one peripheral direction. In addition, in this embodiment, all four cutting edges 15 formed at the four side ridge portions of the rake face 12 are located on one plane in the manner of being vertical to the centerline L.

Among these, the major cutting edge 21 occupies most of the cutting edge 15 in this embodiment, and is comprised of a first major cutting edge portion 21A which is convex as seen from a direction facing the rake face 12 and extends from the corner cutting edge 20, and a second major cutting edge portion 21B which smoothly connects the first major cutting edge portion 21A and extends linearly. Additionally, the first major cutting edge portion 21A is also formed so as to smoothly connects the corner cutting edge 20.

Here, the radius of curvature Re (refer to FIGS. 6A and 6B) of a convex curve formed by the first major cutting edge portion 21A in the above plan view is made larger than the radius of a circular arc formed by the corner cutting edge 20, and is set to the range of 0.6×D to 1.0×D with respect to the diameter of a circle formed around the axis O by the portion of an outer peripheral insert which is attached to the one insert mounting seat 6 located on the outer peripheral side of the drill body 1 in the indexable insert drill of this embodiment and serves as an outer peripheral end with respect to the axis O, that is, with respect to the drill diameter D of the indexable insert drill. In addition, in this embodiment, the first major cutting edge portion 21A is formed in the shape of a circular arc having the radius of curvature Re.

Figure 6A:
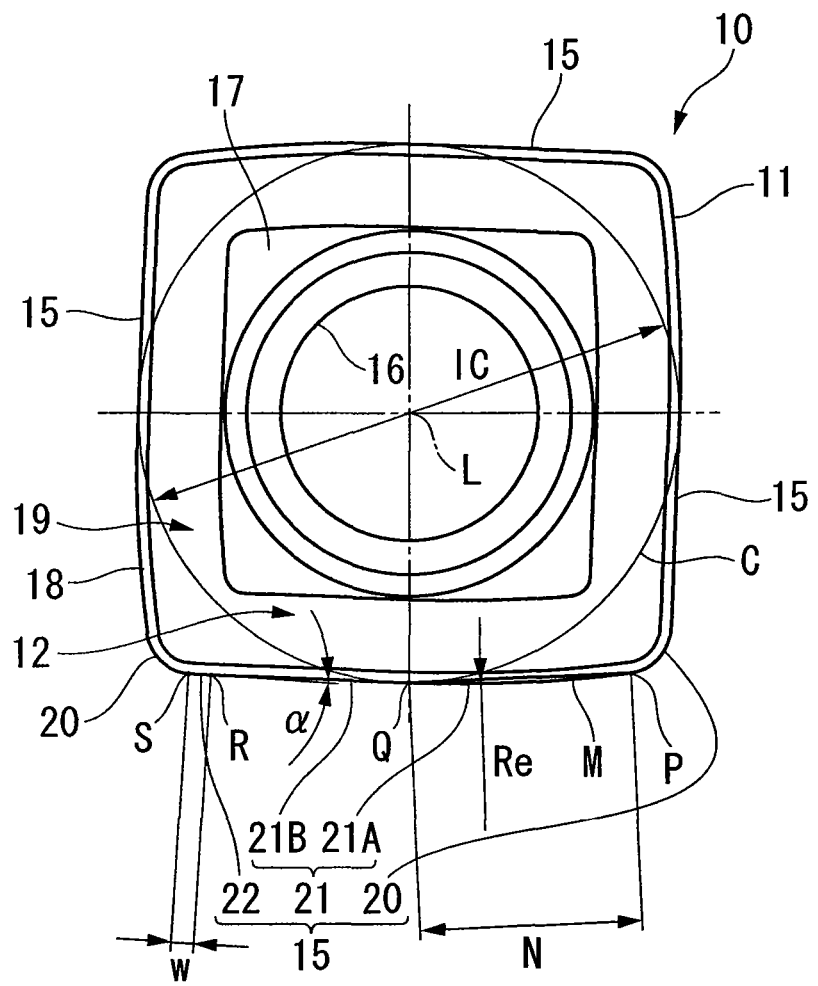
FIGS. 6A and 6B are plan views showing the insert for a drill of one embodiment of the invention.
Figure 6B:
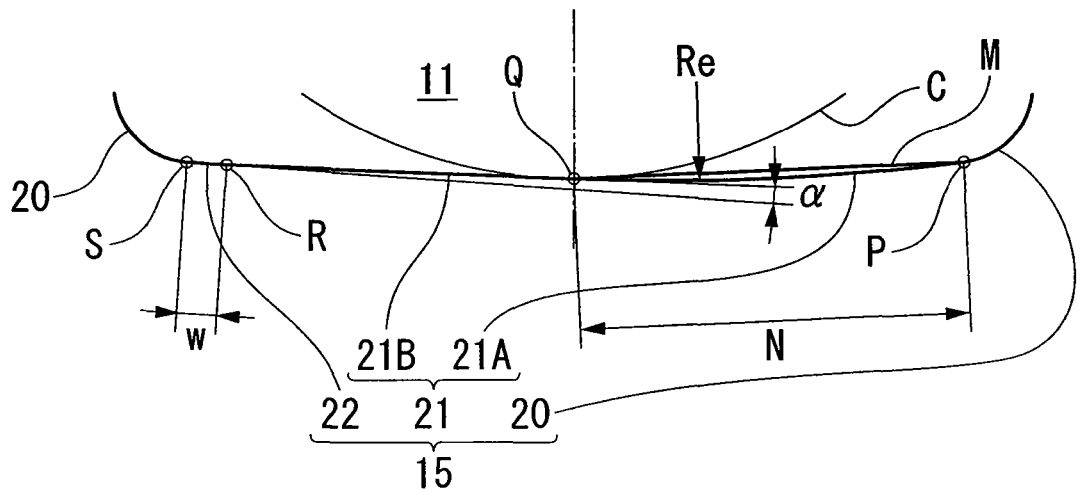

Additionally, as shown in FIGS. 6A and 6B, the length N of a convex curve chord M formed by the first major cutting edge portion 21A, that is, the length of a straight line which connects contact points P and Q, which are contact points of the first major cutting edge portion 21A with the corner cutting edge 20 and the first major cutting edge portion 21A with the second major cutting edge portion 21B, respectively, is set in the range of 0.3×IC to 0.7×IC with respect to the diameter IC of an inscribed circle C inscribed in the rake face 12 in plan view. In addition, the chord M is slightly inclined so as to extend outward from a square formed by the rake face 12 from the contact point P toward the contact point Q.

Moreover, the second major cutting edge portion 21B is slightly inclined, for example, at an angle of about 3° to 8° with respect to an extension line of the chord M of the first major cutting edge portion 21A as it approaches the second major cutting edge portion 21B so as to recede inward from the square formed by the rake face 12 from the contact point Q with the first major cutting edge portion 21A toward the wiper edge 22. In addition, the contact point Q between the first and second major cutting edge portions 21A and 21B is located substantially in the middle of the cutting edge 15 as shown in FIGS. 6A and 6B in this embodiment, and accordingly, the first major cutting edge portion 21A is made longer than the second major cutting edge portion 21B approximately by the length of the wiper edge 22. Additionally, the inscribed circle C is adapted so as to internally touch the rake face 12 at substantially the contact point Q, i.e., so as to touch the cutting edge 15.

Additionally, the wiper edge 22 is formed in the shape of a straight line which extends in a direction in which the wiper edge intersects the second major cutting edge portion 21B at an obtuse angle at an intersection point R in the above plan view, and the angle of this intersection is close to a straight angle of 177° to 179°, that is, an angle α that the extension line toward the second major cutting edge portion 21B forms with respect to the second major cutting edge portion 21B as shown in FIGS. 6A and FIG. 6B is set to 1° to 3°. Additionally, the wiper edge 22 is set to have a length W of 0.1 mm to 0.5 mm in plan view. In this embodiment, as shown in FIGS. 6A and 6B, the length W are made smaller than that of the corner cutting edge 20 as well as the first and second major cutting edge portions 21A and 21B.

In addition, in this embodiment, the wiper edge 22 and the second major cutting edge portion 21B which are in a straight line are connected to each other in the manner of giving a bent having an α angle at the intersection point R, but may be smoothly connected to each other via a convex circular arc or the like around the intersection point R. Meanwhile, the wiper edge 22 is continuous with the corner cutting edge 20 of the next cutting edge 15 adjacent in the one peripheral direction so as to smoothly touch a contact point S.

Figure 7:
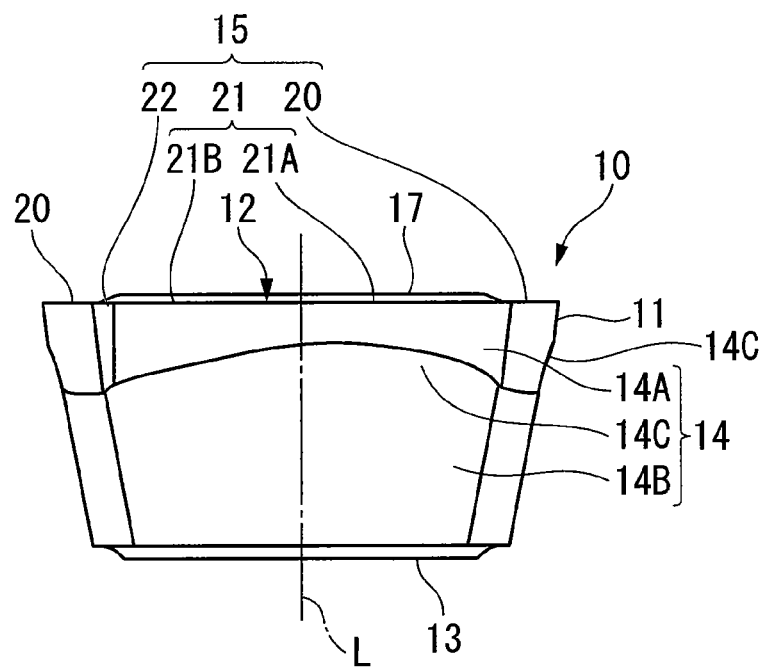
FIG. 7 is a side view of the insert for a drill of the embodiment shown in FIGS. 6A and 6B.
Figure 8:
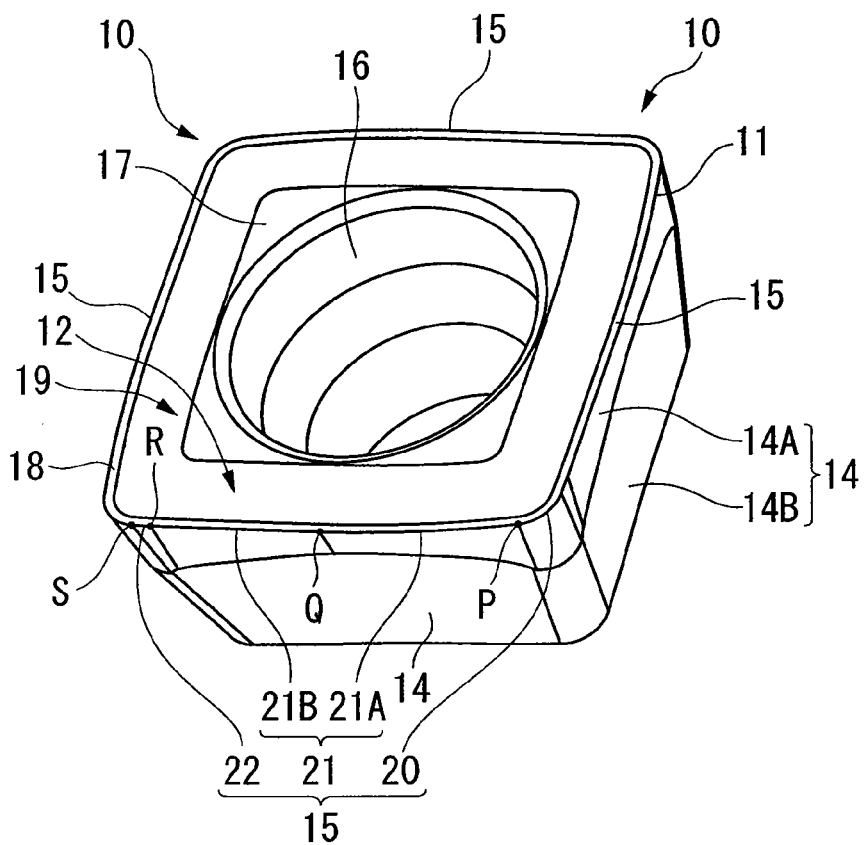
FIG. 8 is a perspective view of the insert for a drill of the embodiment shown in FIGS. 6A and 6B.

Meanwhile, the flank faces 14, as shown in FIG. 7, are formed so as to gradually recede as they get apart from the rake face 12 in the thickness direction, and thereby, the insert 10 for a drill of this embodiment is formed as a positive insert in which the angle of relief is given to the flank faces 14 in advance. Here, each flank face 14 is adapted such that a first flank face portion 14A on the side of the rake face 12 connected to the cutting edge 15 protrudes more than a second flank face portion 14B on the side of the seating face 13 by means of a concave stepped face 14C. Moreover, the angle of relief of the first flank face portion 14A is made smaller than the angle of relief of the second flank face portion 14B.

In addition, in conjunction with the fact that the cutting edge 15 is comprised of the corner cutting edges 20, the major cutting edge 21 including the first and second major cutting edge portions 21A and 21B, and the wiper edge 22, the first flank face portion 14A is formed in the shape of a convex cylindrical surface or in the shape of a convex conical surface in a portion connected to the corner cutting edge 20 toward the above one peripheral direction, is bent in a convex shape in a portion connected to the first major cutting edge portion 21A, and is formed in the shape of an inclined plane in a portion connected to the second major cutting edge portion 21B and the wiper edge 22, and thereby, is arranged in the direction in which they intersect each other at an obtuse angle.

In contrast, in the second flank face portion 14B, a portion connected to the corner cutting edge 20 is formed in the shape of a convex cylindrical surface, or the shape of a convex conical surface, but a portion connected to the major cutting edge 21 and the wiper edge 22 is formed in the shape of a flush inclined plane. This portion is made to contact the wall face of the insert mounting seat 6 and is used as a constraint face which constrains the rotation or the like of the insert body 11. In addition, a concave relief portion is formed over the entire periphery at an intersection ridgeline portion between the flank face 14 and the seating face 13.

In the indexable insert drill of this embodiment, two inserts 10 having the above configuration having the insert body 11 of the same shape and size are detachably attached to the insert mounting seats 6 on the radial inner peripheral side and outer peripheral side such that the rake face 12 faces the drill rotational direction T and the single cutting edge 15 of the four cutting edges 15 is made to protrude toward the tip of the drill body 1. That is, the inserts 10 for a drill attached to the insert mounting seats 6 are of the same type.

Figure 9:
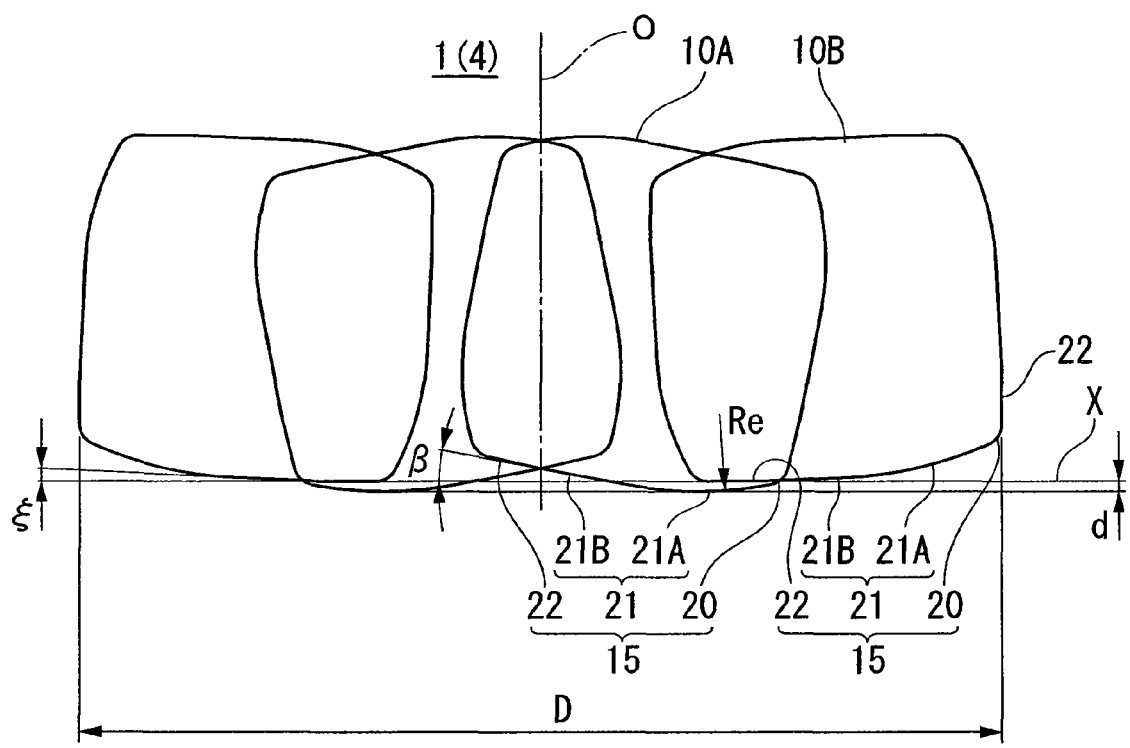
FIG. 9 is a view showing the rotational loci around the axis O of the inner and outer peripheral inserts attached to the tip of the indexable insert drill of the embodiment shown in FIG. 1.

FIG. 9 shows rotational loci around the axis O of the inner and outer peripheral inserts 10A and 10B attached in the above manner. As shown in FIGS. 4, 5, and 9, in both the inner and outer peripheral inserts 10A and 10B, the first major cutting edge portion 21A of the major cutting edge 21 of a single cutting edge 15 of each insert is attached so as to be located on the radial outer peripheral side of the drill body 1. Moreover, in the single cutting edges 15, the outer peripheral corner cutting edge 20 of the inner peripheral insert 10A and the second major cutting edge portion 21B of the outer peripheral insert 10B are made to intersect each other in substantially the rotational locus.

In the outer peripheral insert 10B of the above inserts in this embodiment, the plane where the four cutting edges 15 are located and which is vertical to the centerline L becomes parallel to the axis O. Additionally, as shown in FIG. 9, the wiper edge 22 of the single cutting edge 15 is arranged parallel to an imaginary plane X (the imaginary plane X is a plane vertical to the axis O) passing through an intersection point between the rotational loci of the single cutting edges 15 of the inner and outer peripheral inserts 10A and 10B. Particularly when the rotational loci of the single cutting edges 15 intersect each other on the intersection point R of the outer peripheral insert 10B, the wiper edge 22 is arranged so as to be located on the imaginary plane X. Accordingly, the single cutting edge 15 of the outer peripheral insert 10B extends so as to gradually recede in the direction of the axis O toward the corner cutting edge 20 located on the outer peripheral side from the intersection point R between the wiper edge 22 and the major cutting edge 21 (second major cutting edge portion 21B), and an intersection angle ξ that the second major cutting edge portion 21B of these cutting edges makes with respect to the imaginary plane X is set to the range of 1° to 3°.

Here, in the insert 10 of this embodiment, the four cutting edges 15 are formed so as to be rotationally symmetrical each other by every 90° around the centerline L. Therefore, the wiper edges 22 of adjacent cutting edges 15 are arranged in a direction in which they intersect each other at 90°. Accordingly, the wiper edge 22 of the other single cutting edge 15 adjacent to the radial outer peripheral side of the above single cutting edge 15 is disposed so as to extend parallel to the axis O in the above rotational locus. Also, the wiper edge 22 of the other single cutting edge protrudes toward the outer peripheral side from the outer peripheral face of the cutting portion 4 of the drill body 1, and is located at an outermost outer periphery of the cutting portion 4 and the 1 outer peripheral insert 10B. As a result, the diameter of a circle (circular cylinder) formed around the axis O by the wiper edge 22 becomes the above-mentioned drill diameter D.

Meanwhile, in the inner peripheral insert 10A, at least the wiper edge 22 of the single cutting edge 15, as shown in FIGS. 5 and 9, is arranged at a portion formed so as to protrude toward the opposite side beyond the axis O in the other insert mounting seat 6 on the inner peripheral side of the drill body 1, for example, is disposed such that the intersection point R is located on the axis O in a plan view seen from the direction opposing against the rake face 12 of the inner peripheral insert 10A. Additionally, the second major cutting edge portion 21B on the major cutting edge 21 which extends toward the outer peripheral side from the intersection point R extends so as to face the tip as it approaches the outer peripheral side and is made to intersect the imaginary plane X at an intersection angle β of 3° to 8°.

Also, the second major cutting edge portion 21B of the inner peripheral insert 10A is made to intersect the imaginary plane X in this way. Thereby, in the indexable insert drill of this embodiment, the convexly curved first major cutting edge portion 21A located on the outer peripheral side of the second major cutting edge portion 21B protrudes toward an distal end in the direction of the axis O in the single cutting edges 15 of both the inner and outer peripheral inserts 10A and 10B. Here, for example, the imaginary plane X intersects the second major cutting edge portion 21B of the inner peripheral insert 10A at the contact point Q with the first major cutting edge portion 21A. Thus, when the chord M of the first major cutting edge portion 21A is included in the imaginary plane X, the middle of the convex curve the first major cutting edge portion 21A becomes a protruding end located at an distal end of the indexable insert drill.

Moreover, as shown in FIG. 9, the distance d in the axis of the direction of the drill body between the protruding end of the first major cutting edge portion 21A of the inner peripheral insert 10A in the direction of the axis O, and the distal end of the wiper edge 22 in the direction of the axis O in the single cutting edge 15 of the outer peripheral insert 10B is set to 0.05 mm to 0.3 mm in this embodiment. For example, as described above, when both the chord M of the convex curve formed by the first major cutting edge portion 21A of the inner peripheral insert 10A, and the wiper edge 22 in a single cutting edge 15 of the outer peripheral insert 10B are located on the imaginary plane X, the distance d becomes the protruding height of a convex curve from the chord M in the first major cutting edge portion 21A.

In the indexable insert drill configured in this way, the inner peripheral side (center side) of a machining hole is cut by the single cutting edge 15 of the inner peripheral insert 10A, and the outer peripheral side of the machining hole is cut by the single cutting edge 15 of the outer peripheral insert 10B, and thereby, the machining hole is formed in a work material. Also, since the inner and outer peripheral inserts 10A and 10B are the same inserts 10 for a drill having the insert body 11 of the same shape and size, erroneous attachment of the inner and outer peripheral inserts 10A and 10B does not occur, and an abnormal loss or the like during cutting by erroneous insert arrangement does not occur. Additionally, since it is only necessary to prepare one type of insert 10, insert management can also be simplified significantly.

Also, in the inner peripheral insert 10A of the inner and outer peripheral inserts 10A and 10B, the second major cutting edge portion 21B of the major cutting edge 21 among cutting edges 15 made to protrude toward the tip of the drill body 11 intersects the imaginary plane X (imaginary plane X is a plane vertical to the axis O) passing through the intersection point of two rotational loci of the cutting edges 15 each from the inner and outer peripheral inserts 10A and 10B respectively, and the first major cutting edge portion 21A connected to the second major cutting edge portion 21B and formed in the shape of a convex curve is located at the distal end of the drill body 1 so as to contact a work material.

For this reason, when the single cutting edge 15 contacts the work material, the cutting edge strength thereof is higher compared with, for example, the case where the corner cutting edge 20 with a small radius contacts the work material. Thus, a loss can be prevented from occurring in the cutting edge 15 due to any impact at the time of contact. Meanwhile, since the first major cutting edge portion 21A contacts a work material gradually from the protruding end thereof compared with, for example, a case where a straight cutting edge like the second major cutting edge portion 21B contacts a work material at the same time, radial run out can be kept from occurring in the drill body 1 at the time of contact.

Additionally, in the outer peripheral insert 10B, as described above, the straight wiper edge 22 of the other single cutting edge 15 adjacent to the radial outer peripheral side of a single cutting edge 15 is disposed so as to extend parallel to the axis O of the drill body 1. Thus, the inner wall surface of a machining hole formed by the single cutting edges 15 of the inner and outer peripheral inserts 10A and 10B can be finished by the wiper edge 22. Moreover, since the wiper edge 22 and the second major cutting edge portion 21B connected to the rear end thereof are arranged in a direction in which they intersect each other at an obtuse angle approximate to a straight angle, it is possible to prevent the periphery of the intersection point R from interfering with and damaging the inner wall surface of a machining hole, and a machining hole with a high degree of surface quality can be formed.

According to the insert 10 for a drill of the above configuration and the indexable insert drill to which this insert is attached, the lifespan of the insert can be extended and insert management can be simplified. Moreover, it is possible to form a machining hole which has excellent roundness, concentricity, and cylindricity, has a high degree of precision, and has a high degree of surface quality of an inner wall surface. Additionally, when wear occurs in a single cutting edge 15 protruding toward the tip of the drill body 1, each of the inner and outer peripheral inserts 10A and 10B is rotated at 90° around the centerline L and is attached again, whereby use of the cutting edges 15 is allowed four times, and the lifespan of the insert is extended, which is economical.

Moreover, in this embodiment, the corner cutting edge 20 of the single cutting edge 15 of the inner peripheral insert 10A intersects the second major cutting edge portion 21B of the single cutting edge 15 of the outer peripheral insert 10B in the rotational locus, and the first major cutting edge portion 21A of the major cutting edge 21 connected to the corner cutting edge 20 is made to protrude toward the tip more than the wiper edge 22 of a single cutting edge 15 of the outer peripheral insert 10B. Thus, as will be described later, the wiper edge 22 of the single cutting edge 15 of the outer peripheral insert 10B is not involved in cutting, and more reliably, the outer peripheral insert 10B is rotated at 90° around the centerline L and attached again as described above, so that the inner wall surface of a machining hole can be finished.

In this embodiment, as described above, the radial outer peripheral insert 10B is disposed such that the wiper edge 22 of the other single cutting edge 15 adjacent to the radial outer peripheral side of the single cutting edge 15 extends parallel to the axis O in the rotational locus. However, the wiper edge 22 does not need to be closely parallel to the axis O, and the wiper edge 22 may be extended to a direction of the axis O. For example, the wiper edge 22 is slightly inclined at an angle of about 2° or smaller, and preferably at least 1°, so as to extend the radial inner peripheral side as it approaches the rear end side in the direction of the axis O in the rotational locus.

Additionally, in the insert 10 for a drill of this embodiment, the radius of curvature Re of the convex curve formed by the first major cutting edge portion 21A which contacts a work material as described in the inner peripheral insert 10A is set to the range of 0.6×D to 1.0×D with respect to the drill diameter D of the indexable insert drill, and thereby, loss of the cutting edge 15 and radial run out of the drill body 1 at the time of contact can be further prevented. That is, if the radius of curvature Re is smaller than this range, this case is not different from the case where the corner cutting edge 20 contacts a work material, and thus, loss easily occurs. On the other hand, if the radius of curvature Re is greater than this range, this case is not different from the case where a straight cutting edge contacts a work material, and thus, radial run out easily occurs.

Moreover, since the length N of the chord M of the convex curve formed by the first major cutting edge portion 21A is set to the range of 0.3×IC to 0.7×IC with respect to the diameter IC of the circle C inscribed in the rake face 12, in plan view seen from a direction which faces the centerline L along the rake face 12 (in plan view opposed to the rake face 12) in this embodiment., it is possible to more reliably suppress radial run out at the time of contact and to perform hole machining with a high degree of precision. That is, if the length N of the chord M is smaller than this range, the Re portion formed becomes small. Accordingly, this case becomes the same as the case where a work material is contacted from the corner cutting edge 20, and thus, loss at the time of contact easily occurs. On the other hand, if when the length N of the chord M is greater than this range, the distance of protrusion from the imaginary plane X of the first major cutting edge portion 21A toward the tip becomes large if the radius of curvature Re is the same compared with the case where the length of the chord is within the above range. Therefore, the distance by which only the inner peripheral insert 10A drills a work material at the time of contact also becomes long, and thus, balance is upset and radial run out also occurs easily.

Furthermore, in this embodiment, the length W of the wiper edge 22 is set to 0.1 mm to 0.5 mm in plan view, and the inner wall surface of a machining hole by the wiper edge 22 can be finished reliably and efficiently. That is, if the length W of the wiper edge 22 is smaller than 0.1 mm, there is a possibility that it may become difficult to smoothly finish the inner wall surface of a machining hole when the amount of feed of the drill body 1 at the time of hole machining becomes large. On the other hand, if the length of the wiper edge is greater than 0.5 mm, there is a possibility that the length of contact between the inner wall surface of a machining hole and the wiper edge 22 may become too large, causing an increase in cutting resistance, and the rotational driving force of the drill body 1 may increase more than needed, causing a decrease in machining efficiency.

Moreover, the wiper edge 22 extends in a direction in which the wiper edge intersects the second major cutting edge portion 21B at an angle α of 1° to 3° in the above plan view in this embodiment, and even by this configuration, the inner wall surface of a machining hole by the wiper edge 22 can be finished reliably and efficiently. That is, in the other single cutting edge 15 in which the angle α is smaller than the above range and is close to 0° and which faces the outer peripheral side of the outer peripheral insert 10B, the second major cutting edge portion 21B extends substantially linearly from the wiper edge 22. As a result, there is a possibility that the clearance with the inner wall surface of a machining hole may become small and this second major cutting edge portion 21B may contact a work material, thereby causing an increase in cutting resistance. On the other hand, if the angle α is too large, the amount of feed becomes large. As a result, when the periphery of the intersection point R between the wiper edge 22 and the second major cutting edge portion 21B interferes with the inner wall surface of a machining hole, there is a possibility that this inner wall surface may be damaged and the surface quality thereof may deteriorate.

Meanwhile, in the indexable insert drill of this embodiment, the distal end in the direction of the axis O of the wiper edge 22 in the above single cutting edge 15 of the outer peripheral insert 10B is located at the rear end at a distance d of 0.05 mm to 0.3 mm, with respect to the protruding end in the direction of the axis O of the first major cutting edge portion 21A in the single cutting edge 15 of the inner peripheral insert 10A. Thus, while radial run out can also be suppressed at the time of contact, it is possible to prevent the wiper edge 22 of a single cutting edge 15 of the outer peripheral insert 10B from being involved in the cutting of the bottom face of a hole and not being able to be used for finishing of the inner wall surface of the hole.

That is, if the distance d is smaller than the above range, particularly if the amount of feed of the drill body 1 is large, the wiper edge 22 of the outer peripheral insert 10B is cut into the bottom face of a machining hole formed by the major cutting edge 21 (the first major cutting edge portion 21A) of the inner peripheral insert 10A, and is involved in cutting, whereby wear or the like occurs. Also, as described above, even if the outer peripheral insert 10B is rotated at 90° around the centerline L, and is attached again such that the wiper edge 22 faces the outer peripheral side, there is a possibility that the inner wall surface of a machining hole cannot be finished.

On the other hand, even if the distance d is too large, the distance which is taken until the single cutting edge 15 of the outer peripheral insert 10B contacts a work material after the protruding end of the first major cutting edge portion 21A of the single cutting edge 15 of the inner peripheral insert 10A contacts a work material becomes large. Accordingly, since the state where only the inner peripheral insert 10A contact a work material and perform cutting lasts long, a cutting load which acts on the drill body 1 in the radial direction is unbalanced, and radial run out easily occurs.

Additionally, in this embodiment, the second major cutting edge portion 21B in the single cutting edge 15 of the inner peripheral insert 10A is made to intersect the imaginary plane X at an intersection angle β of 3° to 8°, and even by this configuration, radial run out of the drill body 1 at the time of contact or loss or the like of the cutting edge 15 of the insert 10 for a drill can be prevented effectively. That is, if the intersection angle β is too small, the straight second major cutting edge portion 21B which extends in a direction substantially vertical to the axis O contacts a work material largely along with the first major cutting edge portion 21A, whereby radial run out easily occurs. On the other hand, if the intersection angle β is too large, the portion of the first major cutting edge portion 21A on the side of the corner cutting edge 20 or the corner cutting edge 20 itself contacts a work material, whereby loss in the corner cutting edge 20 easily occurs due to impact at the time of contact.

Moreover, in the indexable insert drill of this embodiment, the second major cutting edge portion 21B in the single cutting edge 15 of the outer peripheral insert 10B is made to intersect the imaginary plane X at an intersection angle ξ of 1° to 3°. Thus, it is also possible to prevent radial run out at the time of contact, and it becomes possible to finish the inner wall surface of a machining hole reliably. That is, if the intersection angle ξ is too small, radial run out easily occurs when the second major cutting edge portion 21B of the single cutting edge 15 of the outer peripheral insert 10B approaches the imaginary plane X vertical to the axis O and the outer peripheral insert 10B contacts a work material. On the other hand, if the intersection angle ξ is too large, the outer peripheral wiper edge 22 connected to the second major cutting edge portion 21B via the first major cutting edge portion 21A and the corner cutting edge 20 may be located on the rear end in the direction of the axis O. As a result, when a machining hole is a blind hole, a possibility that an inner wall surface cannot be finished up to the vicinity of the bottom of the hole occurs.

In addition, as described above, when the chord M of the first major cutting edge portion 21A in the single cutting edge 15 of the inner peripheral insert 10A, and the wiper edge 22 in the single cutting edge 15 of the outer peripheral insert 10B are located on the imaginary plane X, as shown in FIG. 9, the intersection angle ξ becomes approximately equal to an angle α that the extension line of the wiper edge 22 toward the second major cutting edge portion 21B forms with respect to the second major cutting edge portion 21B in the insert 10, and the angle β becomes equal to an angle that the second major cutting edge portion 21B forms with respect to the extension line of the chord M the first major cutting edge portion 21A toward the second major cutting edge portion 21B in the insert 10.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. An insert for a drill comprising a square flat plate-shaped insert body,
   the insert body having one square face being a rake face, each of four side ridge portions of the rake face being formed with a cutting edge,
   the insert for a drill being detachably attached to an indexable insert drill with one of the cutting edges being made to protrude toward the tip of the drill body of an indexable insert drill,
   each of the cutting edges having a corner cutting edge located at a corner of the rake face, and a major cutting edge and a wiper edge which extend substantially toward one peripheral direction of the rake face from the corner cutting edge,
   the major cutting edge having a first major cutting edge portion which has a convexly curved shape and extends from the corner cutting edge, and a second major cutting edge portion which is smoothly connected to the first major cutting edge portion and extends linearly, as seen from a direction facing the rake face, and
   the wiper edge having a straight shape intersecting the second major cutting edge portion at an obtuse angle.

2. The insert for a drill according to claim 1,
   wherein the radius of curvature of a convex curve formed by the first major cutting edge portion in the plan view is set to the range of 0.6×D to 1.0×D with respect to the drill diameter D of the indexable insert drill.

3. The insert for a drill according to claim 1,
   wherein the length of the convex curve chord formed by the first major cutting edge portion is set to the range of 0.3×IC to 0.7×IC with respect to the diameter IC of a circle inscribed in this rake face, as seen from a direction facing the rake face.

4. The insert for a drill according to claim 1,
   wherein the wiper edge is set to have a length of 0.1 mm to 0.5 mm in the plan view.

5. The insert for a drill according to claim 1,
   wherein the wiper edge extends in a direction in which the wiper edge intersects the second major cutting edge portion at an angle of 1° to 3° in the plan view.

6. An indexable insert drill comprising:
   a drill body which is rotated around an axis, and
   at least two inserts for a drill according to claim 1,
   each insert body having the same shape and size, the inserts for a drill being detachably attached to a tip of the drill body on the inner peripheral side and outer peripheral side with respect to the axis of the drill body, and one of the cutting edges thereof being made to protrude from the tip of the drill body,
   wherein the inserts for a drill attached to the radial inner peripheral side and outer peripheral side are adapted such that both the first major cutting edge portions of the single cutting edges are located on the radial outer peripheral side, and the rotational loci of the single cutting edges around the axis of the drill body are made to intersect each other, and
   wherein the radial outer peripheral insert is disposed such that the wiper edge of the other single cutting edge adjacent to the radial outer peripheral side of the single cutting edge extends to a direction of the axis in the rotational locus, and
   wherein the radial inner peripheral insert is adapted such an imaginary plane passing through an intersection point between the rotational loci of the single cutting edges of the radial inner and outer peripheral inserts, and orthogonal to the axis is made to intersect the second major cutting edge portion of the single cutting edge thereof, and the first major cutting edge portion of the single cutting edge in the inner peripheral insert is made to protrude toward a distal end in a direction of the axis of the drill body.

7. The indexable insert drill according to claim 6,
   wherein the distance in the direction of the axis of the drill body between a protruding end of the first major cutting edge portion of the single cutting edge in the axis of the direction in the radial inner peripheral insert, and an extreme end of the wiper edge of the single cutting edge in the direction of the axis of the drill body in the radial outer peripheral insert is set to 0.05 mm to 0.3 mm.

8. The indexable insert drill according to claim 6, wherein the second major cutting edge portion of the single cutting edge in the radial inner peripheral insert for a drill is made to intersect the imaginary plane at an intersection angle of 3° to 8°.

9. The indexable insert drill according to claim 6, wherein the second major cutting edge portion of the single cutting edge in the radial outer peripheral insert is made to intersect the imaginary plane at an intersection angle of 1° to 3°.

* * * * *